United States Patent [19]

Cawthorne

[11] 4,065,221
[45] Dec. 27, 1977

[54] CLAMP FOR SHEATHED ROD, STRAND OR ROPE

[75] Inventor: Stephen Cawthorne, Wadworth, near Doncaster, England

[73] Assignee: Bridon Limited, Yorkshire, England

[21] Appl. No.: 637,240

[22] Filed: Dec. 3, 1975

[30] Foreign Application Priority Data

Dec. 3, 1974 United Kingdom ............... 52211/74

[51] Int. Cl.² ........................................... F16G 11/00
[52] U.S. Cl. ..................................... 403/284; 403/285
[58] Field of Search ................ 403/284, 285, 274, 313

[56] References Cited

U.S. PATENT DOCUMENTS

| | | | |
|---|---|---|---|
| 1,910,269 | 5/1933 | Sunderland | 403/284 |
| 2,166,458 | 7/1939 | Berndt et al. | 403/314 X |
| 3,033,600 | 5/1962 | Drysdale | 403/274 |
| 3,262,724 | 7/1966 | MacRobbie | 403/285 |
| 3,769,685 | 11/1973 | Noda | 403/274 X |

FOREIGN PATENT DOCUMENTS

| | | | |
|---|---|---|---|
| 1,952,862 | 5/1971 | Germany | 403/284 |
| 1,247,307 | 9/1971 | United Kingdom | 403/285 |

*Primary Examiner*—Andrew V. Kundrat
*Attorney, Agent, or Firm*—Emrich, Root, O'Keeffe & Lee

[57] ABSTRACT

This specification describes a clamp comprising a ductile elongate clamp body having a longitudinal channel which receives a hard tubular element divided longitudinally into at least two separable parts held together by retaining means. The clamp is applied to a plastics-sheathed rope by removing the sheathing over a length greater than that of the tubular element but less than that of the body, positioning and retaining the parts of the tubular member about the unsheathed length, inserting the tubular element into the channel in the body, and compacting the ductile clamp body.

9 Claims, 17 Drawing Figures

CLAMP FOR SHEATHED ROD, STRAND OR ROPE

This invention relates to a clamp for application, at an intermediate or terminal position, to a rod, wire strand, or wire rope, sheathed with plastics material. The invention is particularly, but not solely, concerned with steel rod, steel wire strand, and steel wire rope which are to be used as stressing members, especially strands and ropes comprising helically spun filaments of cold-drawn high-tensile carbon steel which, after spinning, are subjected to radial compaction and/or isothermal treatment.

In this specification, for ease of description, stands and ropes will be referred to generically as "cables", and rods an cables will be referred to generically as "lines".

The application of a continuous sheathing of plastics material (e.g. thermoplastic) to a cable to achieve such desirable features as protection against mechanical damage and the effects of exposure to a harmful environment is well known. In applying a clamp to a sheathed cable, the following desiderata, amongst others, are aimed at: an intermediate or terminal clamp should provide positive location and holding, enabling it to sustain loads equal to or in excess of the breaking load of the cable to which it is applied; those areas (if any) where the sheathing has been removed from the cable to allow physical engagement between the clamp and the cable should be sealed off from the exterior with regard to penetration and attack by environmental corrosive agents; the clamp should be able to accommodate a cable without its having to be threaded through a hole bored in the body of the clamp British Patent Specification No. 1,304,055 describes a method of attaching a ferrule or clamp to a wire rope or strand provided with a sheath of thermoplastics material without removing the sheathing. The clamp comprises an elongate body of ductile material having a bore and teeth within the bore; these teeth can be provided by a separate hard one-piece tubular element or liner. The teeth bite into the sheathing. It can be seen that this method does not satisfy all the above desiderata.

The present invention provides a clamp for application to a plastics-sheathed line, comprising a tubular element divided longitudinally into at least two separable parts, retaining means for holding the parts of the tubular element together, and a ductile metallic elongate clamp body longer than the tubular element and having a longitudinal channel which receives the tubular element.

The invention also provides a method of applying the above clamp to a plastics-sheathed line, comprising the sequential steps of:

i. removing the sheathing over a length greater than that of the tubular element but less than that of the clamp body, ii. positioning the parts of the tubular member about the unsheathed length of the line, iii. applying the retaining means to the tubular element, iv. inserting the tubular element into the longitudinal channel of the clamp body, the unsheathed length lying wholly within the channel, and v. compacting the ductile clamp body so as to close the mouth of the channel, to form the interior of the body to the external shape of the tubular element and the parts of the line lying on either side of the tubular element, and to force the tubular element into gripping engagement with the unsheathed length of line.

Preferably, the tubular element has a serrated bore and may conveniently have tapered ends.

In a preferred mode of practising the invention, the two halves of a hardened steel tubular element — which has a serrated parallel bore and externally tapered ends — are positioned round the line at a point where an appropriate length of plastics (e.g., elastomeric) sheathing has been removed; the tubular element is held in position by a circlip. The line thus is subsequently located so that the tubular element lies mid-way along the linear axis of a rounded channel lying within a basically U-section ductile metal member of greater length than diameter. The assembly is then subjected to radial compaction by pressing, in a suitable die set, whereupon the hardened steel tubular element is forced into gripping engagement with the line and, as an integral part of the compacting (pressing) operation, the internal surface of the U-shaped clamp member undergoes plastic flow and deformation to mould itself to the external contour of the tubular element and a portion of the sheathed cable immediately adjacent either end of it. Once the internal consolidation of the assembly has been completed, the radial pressure is increased until the external contour of the clamp member has assumed the shape of the internal contour of the particular die set employed, for instance becoming cylindrical with, mid-way along its length, a peripheral ring projecting at right angles to its longitudinal axis.

The clamp is primarily intended for those radially compacted high tensile cables commonly employed as pre-stressing tendons. Therefore, the tubular element incorporated in the clamp should be as hard as, if not harder than, the cable with which it has to make gripping engagement; likewise, the enveloping clamp body must be made from a material which is less hard and more ductile than the tubular element. Nevertheless, this specialised requirement does not preclude the clamp being applied to non-compacted cables, in which case the tubular element should be of a lower hardness and higher ductility than the cable with which it has to make gripping engagement, and of greater hardness than the encompassing clamp body.

Extension of this basic concept to the clamping of pairs of lines in parallel relationship is achieved by the clamp body incorporating a pair of the aforedescribed U-section members lying parallel to one another in the same plane, the mouths of the channels facing outward, the members (along all or part of their length) being rigidly or integrally interconnected by a block which may conveniently be pierced by one or more holes to allow the clamp to be bolted to an anchorage or structural member. A variation of this particular embodiment would have the members diammetrically opposed on either side of the connecting block with the linear axes of their respective channels being at an angle to one another and not lying in the same plane.

Furthermore, a plurality of paired-line clamps (each housing two lines parallel to one another) may be assembled in stacked relationship and secured to a structural member by a common, centrally disposed, means of attachment.

Still further, a plurality of parallel paired lines may be accommodated in a single clamp body which comprises a metal block having one pair of opposite longitudinal faces machined convex and the other pair of opposite faces concave, both faces being radiused at the place at which they merge longitudinally. Directly opposed pairs of U-section channels are machined equi-distantly in the convex faces, parallel to the axis of the metal block. The pairs of lines, prepared as already described, are appropriately positioned and the assembly pressed in a suitable die set.

The invention is described further, by way of example only, with reference to the accompanying drawings, in which:

FIG. 1 is a perspective view of a portion of bared cable with a hard tubular element held in position by a circlip;

FIG. 2a is an end view of the tubular element;

FIG. 2b is a section along line B—B of FIG. 2a;

FIG. 3 is a perspective view of the prepared cable and tubular element located in a single cable clamp body for pressing;

Figures 1, 2A, 2B, 3:
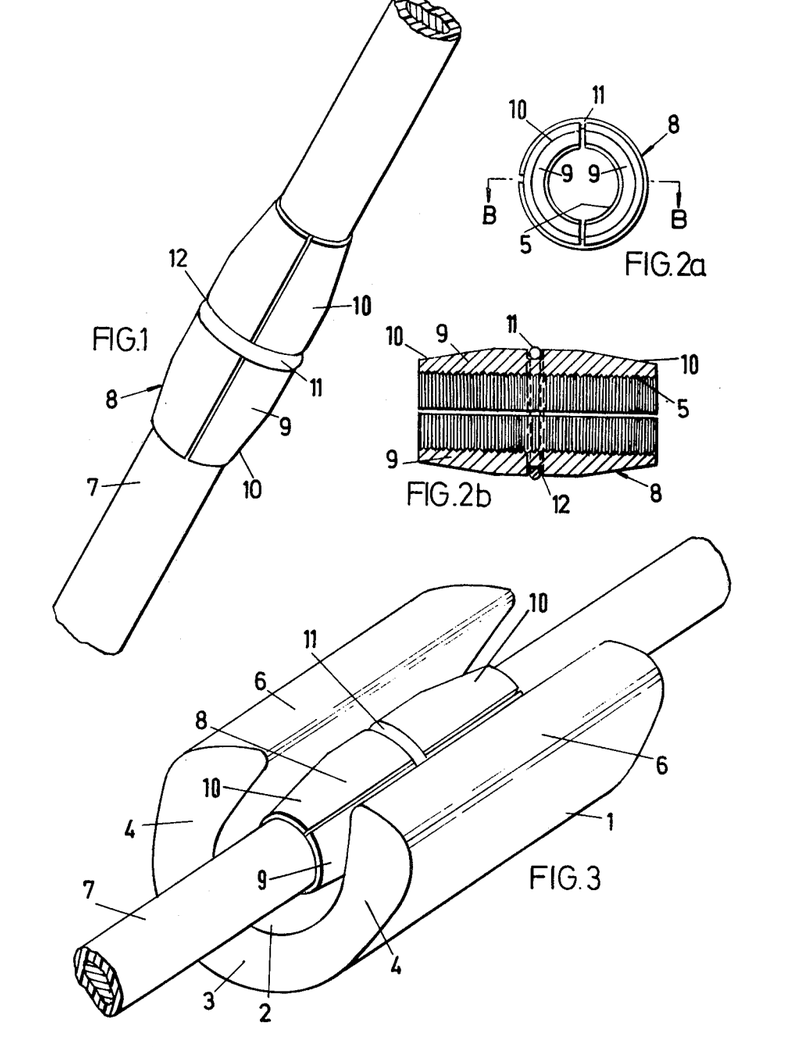

The clamp illustrated in FIGS. 1 to 3 includes an elongate ductile aluminium body which has a rounded channel 2 providing a basically U-shaped cross-section. The side walls 4 progressively thicken from the common semi-circular base 3 to the top where the inner and outer faces of each wall merge into arcs 6 of equal radius.

The plastics-sheathed compacted high-tensile carbon-steelwire cable 7 to be clamped is prepared at the appropriate position by removing a section of sheathing slightly longer than the overall length of a hardened steel tubular element 8 consisting of a parallel-walled hardened steel tube with tapered ends 10 and a serrated bore 5; the element 8 is divided longitudinally into two halves 9, which are held together by a circlip 11 located mid-length in a peripheral recess 12 (see FIGS. 2a and 2b).

Figure 4:
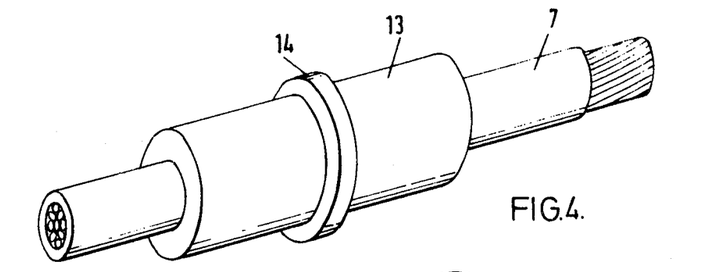
FIG. 4 is similar to FIG. 3 after pressing, showing the clamp produced with an external peripheral ring.

The prepared cable 7 is positioned in the clamp body 1 as shown in FIG. 3, with the tubular element 8 located mid-way along the longitudinal axis of the channel 2, at this stage there is a gap between the two halves 9 of the tubular element. This assembly, when placed in a suitable die set (not shown) and subjected to radial pressure via a hydraulic press, undergoes a progression of mechanical changes. Initially the walls 4 of the channel 2 are displaced inwardly to make physical contact with the tubular element 8, whereupon, because the hardened steel tubular element is relatively incompressible, the pressure is transmitted to the surface of the underlying area of cable, deforming it to the point at which it is fully indented and gripped by the serrated bore of the tubular element 8 (whose two halves 9 are now in contact with each other). Having fully consolidated the tubular element 8 onto the cable 7, continued radial pressure promotes further plastic flow and deformation, closing the mouth of the channel 2. The clamp body, externally, takes the form of a cylinder 13 (FIG. 4) with, midway along its length, a peripheral ridge 14 projecting at right angles to its longitudinal axis; this shape is formed by the die set.

Figure 5:
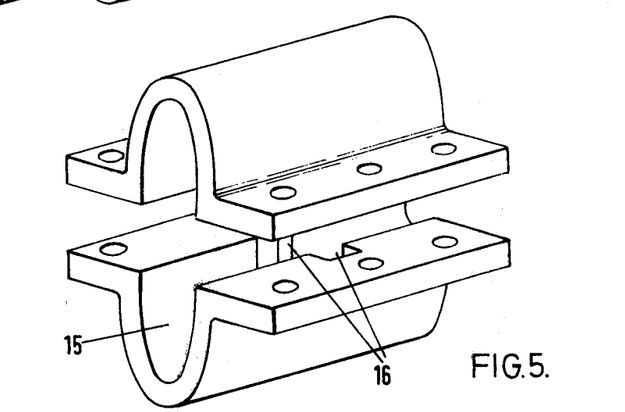
FIG. 5 is a perspective view of an intermediate anchorage for a single cable clamp as shown in FIG. 2.
Figure 6:
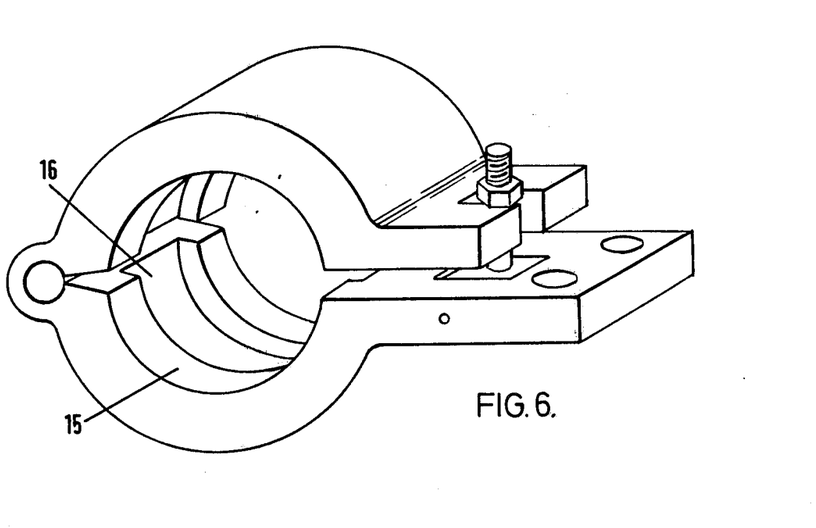
FIG. 6 is a perspective view of a hinged intermediate anchorage for a single cable clamp as shown in FIG. 2.

The cable 7 and applied clamp 13 may be secured to a structural member by a fastening unit (FIG. 5). This unit comprises two halves and, when applied to the clamped cable and bolted to a structural member, it provides a cylindrical bore 15 and annular recess 16 dimensionally capable of accommodating and securing the applied clamp 13 and its ridge 14. An alternative hinged fastening unit, operating in a like manner, is illustrated in FIG. 6.

Figure 7:
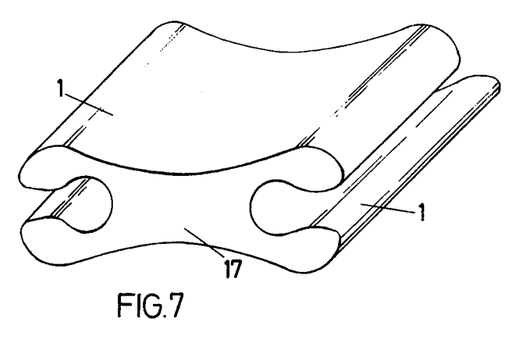
FIG. 7 is a perspective view of a dual clamp body for cables in paralle, before pressing.

In those instances where pairs of cables are to be clamped in parallel relationship, a dual channelled clamp body is employed (FIG. 7). Basically, this clamp body is equivalent to two clamp bodies 1 in back-to-back relationship with a common or integral interconnecting block 17, the channel mouths facing outward.

Figure 8:
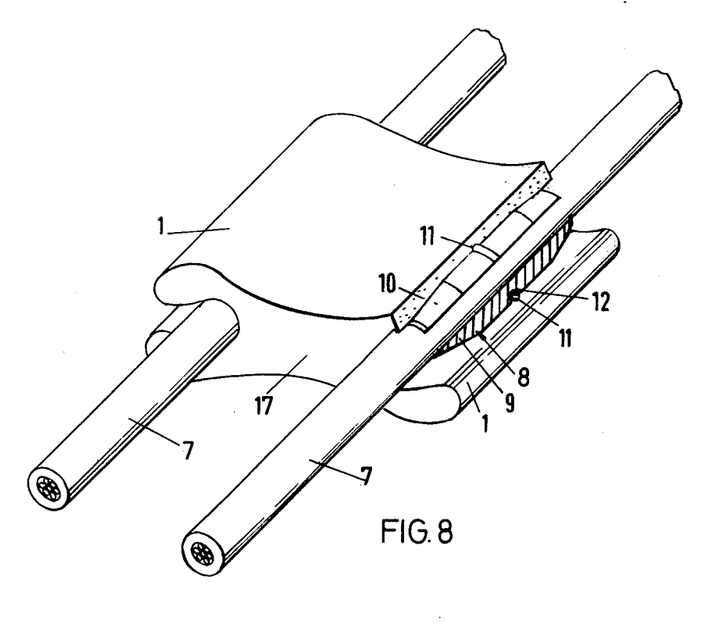
FIG. 8 is a part-sectioned perspective view to show prepared cables in position in the clamp body of FIG. 7, before pressing.
Figure 8A:
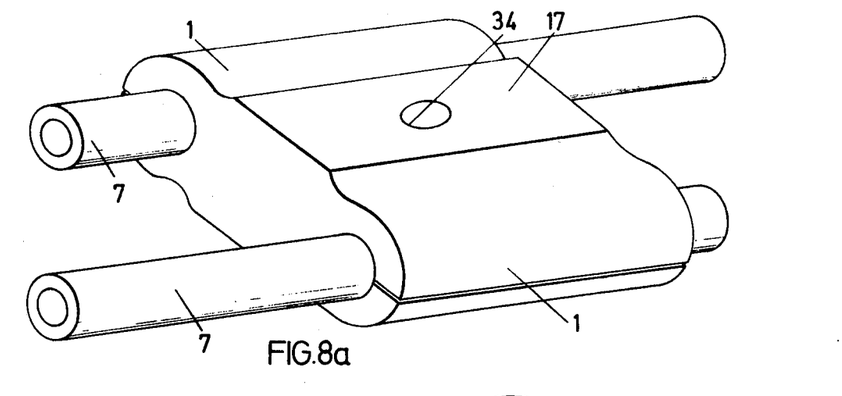
FIG. 8a is similar to FIG. 7, after pressing.

The cables 17 are prepared and the tubular elements 8 incorporated exactly as for the single clamp body, the completed assembly ready for pressing being shown in FIG. 8. FIG. 8a illustrates the end product after pressing in a suitable die set, and shows the block 17 having a drilled hole 34 to facilitate the clamp being bolted direct to a fastening point.

Figure 9:
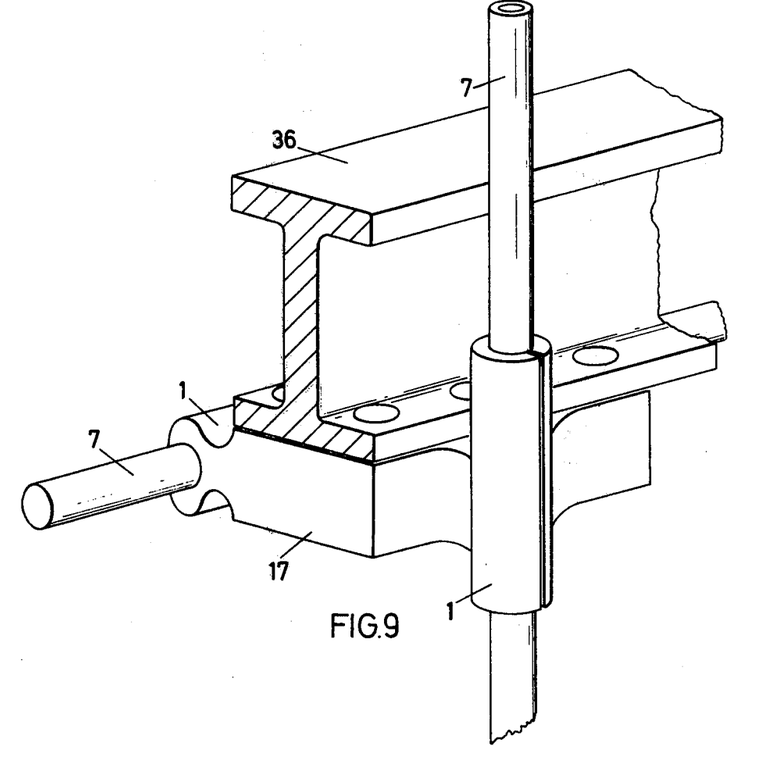
FIG. 9 is a perspective view of a dual clamp securing cables at right angles.

FIG. 9 illustrates a further alternative wherein two clamp bodies 1 are disposed at right angles to one another on opposite sides of an integral interconnecting block 17, which is shown connected to a beam 36.

Figure 10:
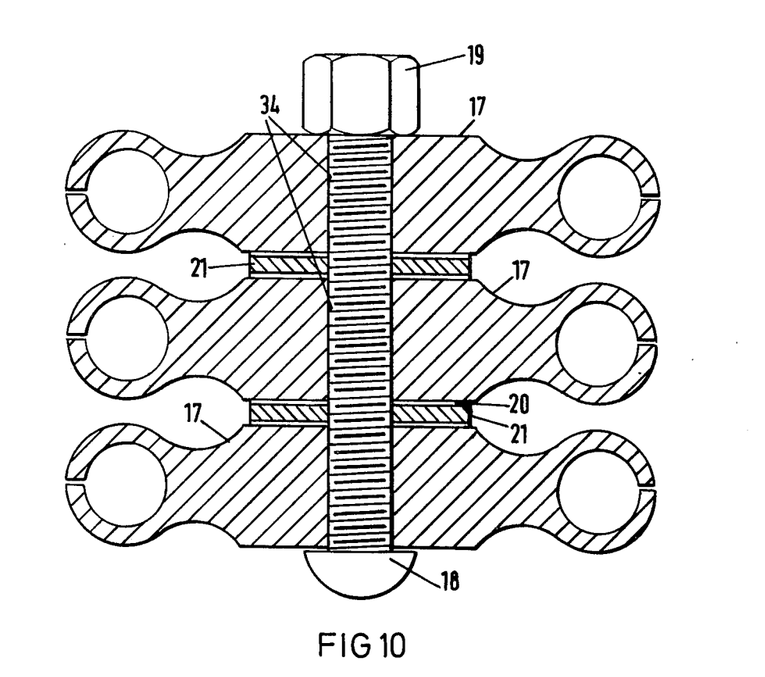
FIG. 10 is a cross-section of a plurality of the dual cable clamps of FIG. 8 in stacked relationship and incorporating radially serrated spacers.
Figure 10A:
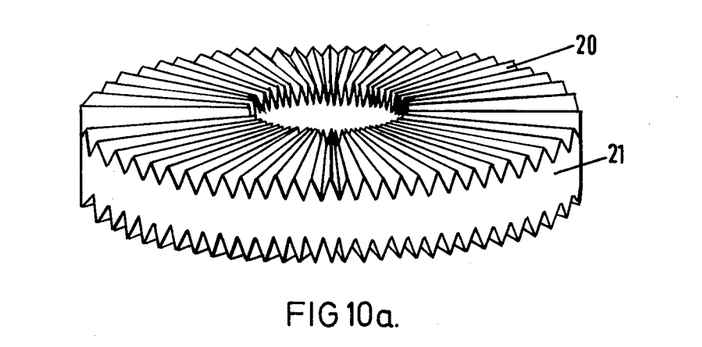
FIG. 10a is a perspective view of a serrated spacer.
Figure 11:
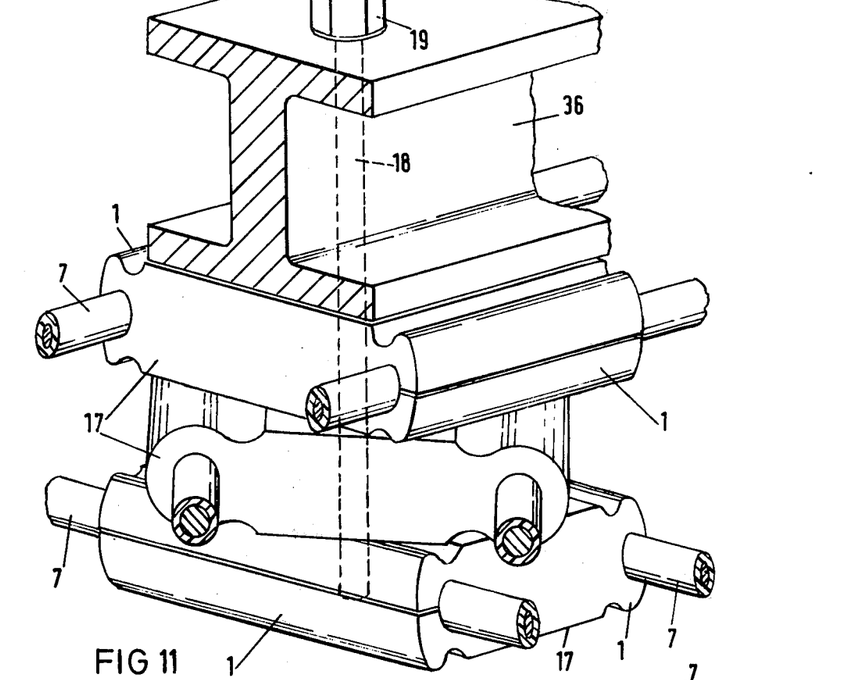
FIG. 11 is a perspective view of a stack of dual cable, clamps at various angles, bolted to a beam.

Dual clamps as shown in FIG. 8 may also be employed in stacked relationship as shown in FIG. 10, in which the cables are omitted for clarity. The clamps are shown as being in vertical alignment, but they can be arranged at angles to one another (FIG. 11). To allow this, each of the dual clamps has a centrally disposed hole 34 drilled in the interconnecting block 17 to allow it to be threaded onto a high tensile steel bolt 18 or other locating means, alternately with radially corrugated, hardened steel compression discs 21 (shown in detail in FIG. 10a).

The bolt 18 (FIG. 10) may form an integral part of a suspension member or pass through a hole 37 in a structural beam 36 (FIG. 11) but, in either case, when a nut 19 is tightened on the bolt, the assembly is progressively compressed until it reaches the point at which the radially disposed corrugations 20 on the compression discs 21 are fully embedded in the respective clamp splines, thereby restricting any turning about the anchorage bolt 18.

Figure 12:
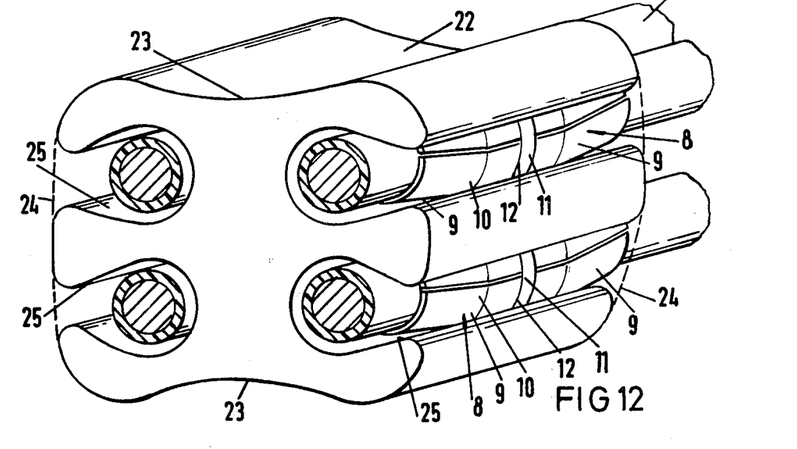
FIG. 12 is a perspective view of a single clamp body holding a plurality of pairs of parallel cables in stacked relationship, before pressing.

A still further embodiment of clamp consists of a single clamp body which is capable of accommodating a plurality of parallel paired cables in stacked relationship — illustrated by the multi-channelled clamp body in FIG. 12. This comprises a block 22 which has concave top and bottom faces 23 and convex side faces 24. Formed equi-distant from the side faces 24 are diametrically opposed pairs of U-section channels 25 which have the same internal cross-sectional configuration as in the single clamp body of FIG. 1.

Figure 13:
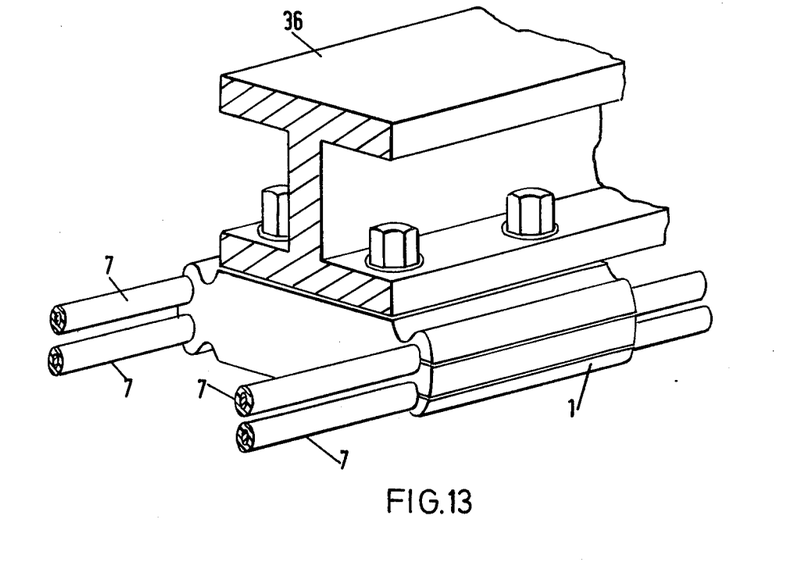
FIG. 13 is similar to FIG. 12, after pressing.

After the cables have been prepared and the hardened steel tubular elements 8 have been applied in the manner already described, the paired cables are located in the appropriate channels and pressed in a suitable die set to produce the end product shown in FIG. 13 attached to a beam 36.

Figure 14:
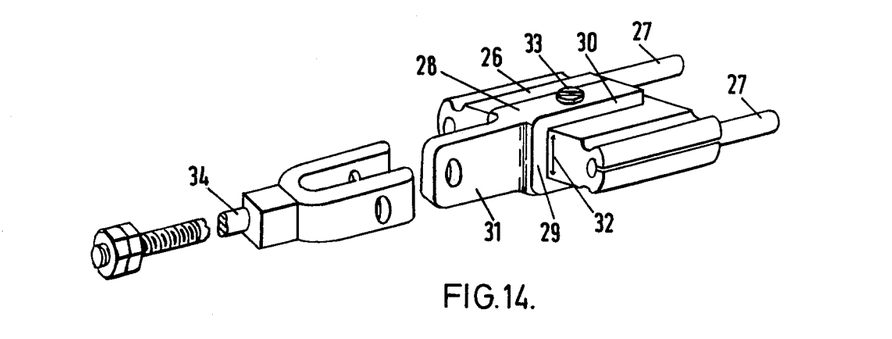
FIG. 14 shows a dual cable clamp used as an end termination.

FIG. 14 illustrates the use of a dual clamp to provide an end termination as distinct from an intermediate fastening. Having applied the clamp 26 to terminate the cable ends 27, the clamp is itself attached to the anchorage point via a connecting piece 28 which comprises a centrally disposed square or rectangular metal plate 29 with two opposing edges extended equally at right angles from one face to form parallel arms 30. Projecting at right angles from the opposite face is a tongue 31, its longitudinal axis being coincident with the central axis of the plate 29. The gap 32 between the fork arms 30 is sufficient to accept the clamp 26 and permit its retention by a locked pin 33 passing through coincident holes drilled in the arms of the fork and body of the clamp. The connecting piece 28 may be directly attached to an anchorage point via the tongue 31 or, as in the present example, by inserting and pinning the tongue into the forked end of a screw-threaded tensioning bar 34.

Various modifications may be made within the scope of the invention as claimed. For instance, the hard tubular element 8 may be of carbon steel, alloy steel, tungsten carbide, or another hard metal or alloy. Also, the ductile clamp body, instead of being of aluminium (or aluminium alloy), may be of mild steel, copper, or copper alloy.

I claim:

1. A clamp for application to a plastics-sheathed line, comprising a hard tubular element divided longitudinally into at least two separable parts, retaining means for holding parts of said tubular element together, and a ductile metallic elongate clamp body longer than said tubular element and having a longitudinal channel which receives said tubular element said longitudinal channel being of substantially U-shaped cross-section and having side walls whose thickness increases between the bottom and the mouth of said channel.

2. A clamp as claimed in claim 1, in which said tubular element has a serrated bore.

3. A clamp as claimed in claim 1, in which said tubular element has tapered ends.

4. A clamp as claimed in claim 1, in which said tubular element is of hardened steel.

5. A clamp as claimed in claim 1, in which said retaining means comprises a circlip located in a peripheral recess in said tubular element.

6. A clamp as claimed in claim 1, in which said metallic body is of aluminium or an aluminum alloy.

7. A clamp as claimed in claim 1, in which said clamp body has a plurality of longitudinal channels each of which recieves a said tubular element, the channels being mutually parallel.

8. A clamp as claimed in claim 1, further comprising a second said tubular element, second said retaining means, and a second said clamp body, and a block rigidly interconnecting said two clamp bodies, the mouths of said respective longitudinal channels of the bodies facing outwards away from the block.

9. A clamp as claimed in claim 8, in which said longitudinal channels are mutually parallel.

* * * * *